United States Patent Office 2,842,497
Patented July 8, 1958

2,842,497

PHOSPHORUS ESTERS CONTAINING DIARYL-AMINES AND POLYEPOXYPOLYHYDROXY POLYETHERS

Forrest J. Watson, Berkeley, Calif., assignor to Shell Development Company, Emeryville, Calif., a corporation of Delaware No Drawing. Application January 5, 1953
Serial No. 329,719

3 Claims. (Cl. 252—49.9)

This invention relates to compounded lubricating oils and, more particularly, to ester type lubricants having dispersed therein a synergistic combination of oxidation and corrosion inhibitors.

Organic compounds, such as lubricating oils, undergo oxidation upon exposure to air. This process is accentuated by elevated temperatures such as occur in engines and other operating machinery. When such organic compositions are used as motor or machinery lubricants, their stability is still further drastically reduced due to their contact with metal surfaces which give up metallic particles into the lubricant. Such abraded or dissolved metals or metal salts act as oxidation catalysts in the lubricant, causing the formation of primary oxidation products which in turn cause further degradation of the organic compounds present in the composition. In addition, water also causes corrosion of metallic surfaces and accentuates oxidation of the lubricant. Problems of this nature are encountered in mineral oils but appear to be particularly troublesome in synthetic oleaginous fluids exemplified by esters, as more particularly defined hereinafter, such as phosphates, carboxylates and silicates.

Numerous oxidation and corrosion inhibitors have been found for use in lubricating compositions and many combinations thereof also have been tested. In many instances the effect of such combination is merely the additive effect of each of the inhibitors employed. In other cases synergism is exhibited between the additives used, thus promoting to an unaccountable degree the oxidation and corrosion protection of the composition. It is impossible to predict, however, just which classes of inhibitors will be effective synergists until such combinations have actually been tested and found to be advantageous. Moreover, the results obtained in a particular chemical class of lubricating base is not indicative of the results to be expected in other organic media. For example, a class of oxidation or corrosion inhibitor which is effective in mineral oil may be substantially ineffective, or even act as a pro-oxidant, when utilized in an ester type oleaginous fluid. Likewise, synergizing pairs or sets of additives which are effective for this purpose in mineral oil may have little or no advantage when employed in ester lubricants.

It is an object of the present invention to provide improved oleaginous compositions. It is a further object of this invention to provide improved hydraulic fluids and lubricating compositions which are resistant to degradation or oxidation and exhibit improved corrosion characteristics. It is a particular object of this invention to provide improved ester type oleaginous fluid compositions.

Now, in accordance with this invention, it has been found that oleaginous polyesters can be stabilized to an outstanding degree, particularly with respect to their corrosion-producing oxidation products, by the incorporation therein of an organic epoxy compound combined with an aromatic amine containing a plurality of aryl-amino linkages.

The polyesters contemplated include particularly esters of phosphorus acids such as phosphates, phosphonates and phosphinates; esters of silicon acids, e. g. silicates and siliconates; carboxylicesters, especially esters of polybasic acids, etc., and mixtures thereof.

Further examples are the polymeric epoxides formed by reacting a polyhydric alcohol with a sufficient excess of a polyepoxide or a halogen-containing epoxide, preferably in the presence of an alkaline catalyst. Examples of such polyhydric alcohols are resorcinol, catechol, bisphenol (2,2 - di - p - phenolpropane), 4,4' - dihydroxydiphenyl-methane, bis(2,2'-dihydroxydinaphthyl)methane, the polyhydroxy naphthenes, propylene glycol, trimethylene glycol, butylene glycol, glycerol, sorbitol, mannitol pentaerythritol, and the ethylenically unsaturated or the halogen-containing polyhydric derivatives of any of the above types of polyhydric alcohols. The polyepoxides may be exemplified by 1,2-epoxy-3,4-epoxybutane, 1,2-epoxy-4,5-epoxypentane, bis(2,3-epoxypropyl) ether, bis (2,3-epoxybutyl) ether, bis(2,3-epoxy-2-methylpropyl) ether. The halogen-containing epoxides are exemplified by epichlorohydrin, 3-chloro-1,2-epoxybutane, 3-bromo-1,2-epoxyhexane, 3-chloro-1,2-epoxyoctane, and the like. Polymers of this type have structures analogous to that illustrated below for the particularly preferred product of the reaction between bisphenol and epichlorohydrin:

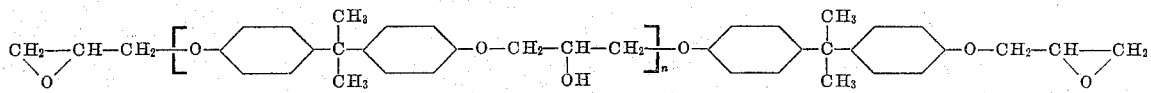

wherein $n$ represents a number from about 0 to about 10.

Other examples of this group of materials are the polymers and copolymers of the epoxy-containing monomers possessing at least one polymerizable aliphatic carbon-to-carbon multiple bond, such as an ethylenic group $>C=C<$. When this type of monomer is polymerized in the substantial absence of alkaline or acidic catalysts, such as in the presence of heat, oxygen, peroxy compounds, actinic light, and the like, they undergo addition polymerization at the multiple bond leaving the epoxy group unaffected. These monomers may polymerize with themselves or with other ethenoid monomers, particularly the vinyl-type monomers, i. e. those containing at least one $CH_2=C<$ group, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate.

Illustrative examples of these polymers and copolymers containing the epoxy groups are poly(allyl 2,3-epoxypropyl ether); poly-2,3-epoxypropyl crotonate); allyl 2,3-epoxypropyl ether-styrene copolymer; methallyl 3,4-epoxybutyl ether-allyl benzoate copolymer; poly(4,5-epoxypentyl crotonate); poly(4,5-epoxypentyl acrylate); poly(2,3-epoxypropyl cyclohexenoate); poly(vinyl 2,3-epoxypropyl ether); allyl glycidyl ethervinyl acetate copolymer; poly(methallyl 2,3-epoxypropyl ether); poly-(allyl 1-methyl-2,3-epoxypropyl ether); poly(4-glycidyloxystyrene); and poly(1-vinyl-2-pentadecyl glycidyl ether).

The preferred group of epoxy-containing organic materials to be employed in the process of the invention are those organic materials containing a plurality of epoxy-substituted organic radicals, preferably hydrocarbon, which are joined to other organic radicals, preferably hydrocarbon, through ether linkages. Examples of this preferred group of compounds are 1,4-bis(2,3-epoxypropoxy)benzene, 1,3 - bis(2,3-epoxypropoxy)benzene, 1,3-bis(3,4-epoxybutoxy)benzene, 1,4 - bis(2,3 - epoxypropoxy) cyclohexane, 4,4'-bis(2,3-epoxypropoxy)di-phenyldimethylmethane, 1,3-bis(2,3-epoxypentoxy) 5-chlorobenzene, 1,3-bis(2-hydroxy-3,4-epoxybutoxy) benzene, 1,2,3-tri-(2-hydroxy-3,4-epoxypentoxy)-propane, the polymer obtained by reacting resorcinol with an excess of epichlorohydrin, polymer prepared by reacting bisphenol with an excess of bis-(2,3-epoxypropyl) ether, the polymer prepared by reacting sorbitol with an excess of bis(2,3-epoxypropyl)-ether, poly(allyl-2,3-epoxypropyl ether), poly(2,3-epoxypropyl crotonate), and the like.

A particularly preferred group of epoxy-containing organic materials to be employed in the process of the invention are the members of the group consisting of the organic compounds possessing a plurality of epoxyalkoxy radicals, preferably 2 to 4, joined to an organic radical which contains from one to two aromatic rings, organic compounds possessing a plurality of epoxyhydroxyalkoxy radicals, preferably 2 to 4, joined to an organic radical containing from one to two aromatic rings, the polyepoxy-containing polymeric reaction product of an aromatic polyhydric alcohol and epihalohydrin, the polyepoxy-containing polymeric reaction product of an aliphatic polyhydric alcohol and epihalohydrin, the polyepoxy-containing polymeric reaction product of an aromatic polyhydric alcohol and a polyepoxide compound, the polyepoxy-containing polymeric reaction product of an aliphatic polyhydric alcohol and a polyepoxide compound, the polymers of the epoxy-containing monomers possessing at least one polymerizable aliphatic carbon-to-carbon multiple bond prepared in the absence of alkaline or acidic catalysts, and copolymers of the foregoing epoxy-containing monomers and a monomer containing at least one $CH_2=C<$ prepared in the absence of alkaline or acidic catalyst. The expression "epoxy-alkoxy radical" refers to an alkoxy radical substituted with an epoxy group. The expression "epoxyhydroxalkoxy radical" refers to an alkoxy radical substituted with a hydroxyl group and an epoxy group. Illustrative examples of this particularly preferred group of compounds are 1,4-bis(2,3-epoxypropoxy)benzene, 1,3-bis(2,3-epoxypropoxy) benzene, 1,3-bis(2,3-epoxybutoxy)benzene, 4,4'-bis(2,3-epoxypropoxy)diphenyldimethylmethane, 1,3-bis(2-hydroxy-3,4-epoxybutoxy)benzene, 1,2,3-tri(2-hydroxy-3,4-epoxypentoxy) naphthalene, the polymer obtained by reacting resorcinol with epichlorohydrin, the polymer prepared by reacting resorcinol with bis(2,3-epoxypropyl) ether, the polymer prepared by reacting sorbitol with epichlorohydrin, poly(allyl-2,3-epoxypropyl ether) and poly(2,3-epoxypropyl crotonate).

The most suitable epoxy-containing organic materials are those having a low degree of evaporation from the stabilized compositions, e. g. those having a boiling point above 300° C. When polymeric epoxides are employed, an average molecular weight between about 300 and about 1500 is preferred.

The preparation of many of the above-described epoxy-containing organic materials is described in U. S. Patent 2,585,506.

Diarylamines suitable for use in the subject compositions include those wherein two hydrocarbyl groups containing aromatic radicals are directly attached to an amino nitrogen atom. The aryl groups may be similar or dissimilar and include especially phenyl and naphthyl radicals as well as their alkyl or alkylene analogs and homologs. The following are typical:

Phenyl-alpha-naphthylamine
Phenyl-beta-naphthylamine
Diphenylamine
Di-alpha-naphthylamine
Di-beta-naphthylamine The above additives should each be present in the lubricating compositions so that their combined amounts effectively reduce the oxidation of the subject poly ester lubricants and particularly diminishes the tendency of such esters to form corrosion by products. While the effective amounts of each will vary with the specific conditions under which the composition is to be employed, these proportions will ordinarily vary between about 0.25% and about 5% each by weight of the total composition.

It has been determined that the two main classes of additives defined hereinbefore perform in a synergistic manner when incorporated in poly ester type lubricants which are then subjected to elevated temperatures in the presence of oxygen. The synergistic effect is especially noticeable when metals are present such as copper, iron, magnesium, aluminum and cadmium. While esters in general appear to respond to the synergistic combination defined, it has been found that the latter is especially effective when utilized in an ester of phosphorus acid, silicic or dicarboxylic acid.

THE ESTERS

Phosphorus esters useful for the base lubricant in the present compositions comprise the normally liquid aliphatic esters of acids of phosphorus. While the trialkyl phosphates are particularly preferred, other classes are suitable in addition to or in place of said phosphates. These include aryl phosphates, aryl alkyl phosphates, dialkyl hydrocarbon phosphonates, and especially dialkyl alkanephosphonates.

The phosphorus esters which are particularly useful in these compositions ordinarily have a total of at least 18 carbon atoms per molecule; preferably this total is between about 20 and about 32 carbon atoms per molecule. Typical trialkyl phosphates which are especially suitable contain alkyl radicals having from about 6 to about 12 carbon atoms each and include the following:

Trihexyl phosphates
Triheptyl phosphates
Trioctyl phosphates, e. g., tri(2-ethylhexyl)phosphate or tri(isooctyl)phosphate
Trinonyl phosphates, e. g., tri(3,5,5-trimethylhexyl)phosphate
Tridecyl phosphates
Tridodecyl phosphates
Dihexhyl octyl phosphate Typical species of phosphonates and phosphinates are given below:

Dialkyl hydrocarbonphosphonates:
    Di(2-ethylhexyl)hexanephosphonate
    Dihexyl hexanephosphonate
    Dioctyl 3,5,5-trimethylhexanephosphonate
    Dihexyl benzenephosphonate
Alkyl dialkanephosphinates:
    Butyl di(2-ethylhexane)phosphinate
    Hexyl diheptanephosphinate.

Supplementing the combination of inhibitors, these compositions may contain additives such as viscosity index improvers, extreme pressure agents, pour point depressants and anti-wear agents. The following examples illustrate the synergistic effects gained by the use of various combinations of additives as described hereinbefore. The test employed in examining the subject compositions comprises heating 20 cc. of the fluid composition at a temperature of 175° C. for 71 hours in the presence of 0.4 square inch of each of the metals listed in the following tables, while bubbling 1 liter of air per hour through the sample. The apparatus employed is a small-scale model of that described in Federal Specification Catalog VV–L–791D as method 530.8.2.

Example I

| | Percent Epoxide [1] | Percent Phenyl-α-naphthyl-amine | Weight Loss, mg./cm.² | | | | | Percent Visc. Incr. at 100° F. | Acid Neut. No. |
|---|---|---|---|---|---|---|---|---|---|
| | | | Cu | Mg | Fe | Cd | Al | | |
| Trioctyl phosphate: | | | | | | | | | |
| 98 | 1 | 1 | 0.52 | +0.16 | 0 | +0.04 | 0 | 8.5 | 3.04 |
| 98 | 0 | 2 | 16.6 | 0.12 | 0.08 | 1.36 | 0.08 | 17 | 14.4 |
| 98 | 2 | 0 | 84.8 | 0.48 | +0.20 | 23.2 | 0 | 327 | 147 |

[1] See footnote, Example IV.

Example II

| | Percent Epoxide [1] | Percent Phenyl-α-naphthyl-amine | Weight Loss, mg./cm.² | | | | | Percent Visc. Incr. at 100° F. | Acid Neut. No. |
|---|---|---|---|---|---|---|---|---|---|
| | | | Cu | Mg | Fe | Cd | Al | | |
| Triisooctyl phosphate: | | | | | | | | | |
| 100% | | | 44.7 | 70.6 | 0.16 | | 0.32 | | 99.5 |
| 98 | 2 | 0 | 45.8 | 4.36 | +1.28 | 5.12 | 0.92 | 161 | 131 |
| 98 | 0 | 2 | 5.32 | 24.28 | 0.04 | 20.24 | 0.08 | 81 | 19.8 |
| 98 | 1 | 1 | 1.88 | 0 | 0 | 0 | 0 | 10.5 | 20.3 |

[1] See footnote, Example IV.

Example III

| Tri (iso-octyl) phosphate, wt. percent | Tricresyl phosphate, wt. percent | Percent Epoxide [1] | Percent Phenyl-α-naphthyl-amine | Oxidation-Corrosion Test | | | | | Percent Visc. Incr. at 100° F. | Acid Neut. No. |
|---|---|---|---|---|---|---|---|---|---|---|
| | | | | Weight Loss, mg./cm.² | | | | | | |
| | | | | Cu | Mg | Fe | Cd | Al | | |
| 92 | 5 | 3 | 0 | 4.8 | 0.3 | 0.2 | 25.0 | 0.1 | 313 | 137 |
| 92 | 5 | 0 | 3 | 6.8 | 20.5 | 0.1 | 34.1 | 0 | | 33 |
| 95 | 2 | 1 | 2 | 0.1 | 0.1 | 0 | 0 | 0 | 7.5 | 8.6 |

[1] See footnote, Example IV.

Example IV

| Dinonylisooctene phosphonate, wt. percent | Di (2-ethylhexyl) Adipate, wt. percent | Percent Epoxide [1] | Percent Phenol-α-naphthyl-amine | Wt. Percent Acryloid | Oxidation-Corrosion Test | | | | | Percent Visc. Incr. at 100° F. | Acid Neut. No. |
|---|---|---|---|---|---|---|---|---|---|---|---|
| | | | | | Weight Loss, mg./cm.² | | | | | | |
| | | | | | Cu | Mg | Fe | Cd | Al | | |
| 55.1 | 35.4 | 4 | 0 | 5.5 | 6.8 | 3.5 | 0.4 | 11.5 | 3.8 | Solid | 166 |
| 55.5 | 35.6 | 0 | 4 | 4.9 | 5.0 | 12.9 | 0 | 28.5 | 0.1 | 19 | 3.4 |
| 55.5 | 35.6 | 2 | 2 | 4.9 | 0.1 | 0 | 0 | 0.1 | 0 | 20 | 0.8 |

[1] The epoxide employed in these tests was the reaction product of bisphenol and epichlorohydrin, having a molecular weight of about 300.

I claim as my invention:

1. A lubricating composition consisting essentially of a major amount of trioctyl phosphate and from about 0.25% to about 5% by weight each of a condensation product of about equimolar proportions of bisphenol with epichlorohydrin and phenyl alpha naphthylamine.

2. A lubricating composition consisting essentially of a major proportion of triisooctyl phosphate and from about 0.25% to about 5% each by weight of a condensation product of about equimolar proportions of bisphenol with epichlorohydrin having a molecular weight between about 300 and 1500 and a phenyl naphthylamine.

3. A lubricating composition consisting essentially of a major amount of a trialkylphosphate, each alkyl radical of which contains at least six carbon atoms, said phosphate containing 18–32 carbon atoms and from about 0.25% to about 5% by weight each of a condensation product of about equimolar proportions of a bis(hydroxyphenyl)propane with epichlorohydrin and a phenyl naphthyl amine.

References Cited in the file of this patent

UNITED STATES PATENTS

| | | |
|---|---|---|
| 2,500,600 | Bradley | Mar. 14, 1950 |
| 2,509,620 | Watson et al. | May 30, 1950 |
| 2,549,270 | Watson | Apr. 17, 1951 |
| 2,609,343 | Saunders et al. | Sept. 2, 1952 |
| 2,660,563 | Banes et al. | Nov. 24, 1953 |
| 2,662,815 | Rudel | Dec. 15, 1953 |
| 2,686,760 | Watson | Aug. 17, 1954 |
| 2,687,377 | Stewart | Aug. 24, 1954 |